United States Patent [19]

Jordan et al.

[11] 4,313,035
[45] Jan. 26, 1982

[54] METHOD OF PROVIDING PERSON LOCATOR SERVICE

[75] Inventors: David S. Jordan, Aberdeen; Roy P. Weber, Bridgewater, both of N.J.

[73] Assignee: Bell Telephone Laboratories, Incorporated, Murray Hill, N.J.

[21] Appl. No.: 113,383

[22] Filed: Jan. 18, 1980

[51] Int. Cl.³ .................. H04M 3/42; H04M 7/06; H04M 15/16; H04Q 3/70
[52] U.S. Cl. ........................ 179/18 BE; 179/8 R; 179/18 BF; 179/18 D
[58] Field of Search ............ 179/18 BE, 18 BF, 18 B, 179/2 TC, 8 R, 7.1 R, 18 D, 18 DA

[56] References Cited

U.S. PATENT DOCUMENTS

| Re. 28,337 | 2/1975 | Singer | 179/18 ES |
|---|---|---|---|
| 2,957,047 | 10/1960 | Wennemer | 179/18 BE |
| 3,506,791 | 4/1970 | Malaby | 179/2 EB |
| 3,641,276 | 2/1972 | Keller et al. | 179/18 BF |
| 4,162,377 | 7/1979 | Mearns | 179/18 D |
| 4,178,476 | 12/1979 | Frost | 179/2 EC |
| 4,191,860 | 3/1980 | Weber | 179/18 B |

FOREIGN PATENT DOCUMENTS 2749803 5/1979 Fed. Rep. of Germany ... 179/18 BE

OTHER PUBLICATIONS

"New Custom Calling Services", Bergland et al., International Switching Symposium, Paris, May 1979, pp. 1-7.

Primary Examiner—Thomas W. Brown
Attorney, Agent, or Firm—J. W. Herndon; F. W. Padden

[57] ABSTRACT

A method is disclosed of using the public switched telephone network, including the CCIS (Common Channel Interoffice Signaling) system, to provide nationwide personal locator telephone service for called subscribers. In accordance with the service, a calling party may reach a called subscriber wherever the subscriber may be located by merely keying from a standard push-button telephone set a personal number unique to the subscriber. A telephone office having access to CCIS sends the number to a centralized data base. A telephone number at which the subscriber is located is returned to the access office, and the call is automatically completed to the telephone number. Other information may be returned to the access office to provide enhanced features. Such features include called subscriber unavailability announcements to the calling party, storage of a caller's telephone number, automatic call-back by the subscriber, and paging of the subscriber. A subscriber may update the information stored at the centralized data base from any telephone.

31 Claims, 6 Drawing Figures

FIG. 5

PERSON LOCATOR MEMORY TABLE
PIN 583-1000

| WORD | | | | | | | |
|---|---|---|---|---|---|---|---|
| 0 | COLLECT PIN - 2356 | | | | | | |
| 1 | PL PIN - 9446 | | | | | | |
| 2 | CALL COMPLETION NO. | | | | | | |
| 3 | AC<br>AUTO<br>COLLECT | ACAC<br>ALL<br>CALLS<br>AUTO<br>COLLECT | ACA<br>AUTO<br>COLLECT<br>ALLOWED | ITF<br>IN-<br>TRANSIT<br>FLAG | UNAV<br>UNAVAILABLE | PAF<br>PAGING<br>FLAG | CB<br>CALLBACK<br>IN<br>PROGRESS | PLCA<br>PL<br>CALLING<br>ACTIVE |
| 4 | CALLBACK QUEUE | | | | | | |
| | CALLBACK NO. | | | | | | |
| N | CALLBACK NO. | | | | | | |

METHOD OF PROVIDING PERSON LOCATOR SERVICE

TECHNICAL FIELD

The invention pertains to telephone systems in general, and particularly to the provision of a new calling service. More specifically, the invention pertains to a new telephone service whereby a subscriber may control the completion of calls directed to the subscriber. In particular, the method allows a subscriber to control the direct completion of calls to any station desired, as well as the denial of calls. Numerous other features under the direct control of the subscriber may be easily provided.

BACKGROUND OF THE INVENTION

It has long been considered desirable to allow telephone subscribers as much control as possible in the processing of calls, thereby reducing the need for operators and enhancing the privacy of telephone communication. Such subscriber controlled services have primarily been directed to calling parties in the past. Direct Distance Dialing (DDD) is a prime example of such a type of service in the telephone network. A more recent example is Automatic Bill Calling (ABC) service, described in Mearns U.S. Pat. No. 4,162,377 of July 24, 1979. In ABC calling, calling parties may control the completion of special calls such as credit card, collect, and bill to third number, all without operator intervention.

It is also desirable for called parties to be able to control the disposition of calls directed to them. For example, it is desirable for a called party to be able to control the diversion of calls to telephone stations other than the station at which the called party normally resides. In fact, such a service, usually referred to as call-forwarding, is currently available to many subscribers who are served by stored program electronic switching offices, such as the ESS (Electronic Switching System) No. 1, manufactured by Western Electric Co., Inc. A party served by a local ESS 1 office and who subscribes to call-forwarding service has stored in memory at the office data identifying the party as a subscriber. In addition, data is also stored at the office indicating if the service is activated and, if so, a directory number to which incoming calls are to be forwarded. Briefly, the service operates as follows. When an incoming call is received, the stored program of the office directs the interrogation of the memory data associated with the called station to determine if the called party subscribes to call-forwarding service. If not, or if the service is not activated, the call is completed to the called station in ordinary fashion. If a call-forwarding service, however, is active for the party, the stored program obtains the forwarding number from memory and from that point acts, effectively, as an originating office with respect to the new number. That is, the office may complete the call locally to the new number if it is served by the office, or it may seize an outgoing trunk to another local office or to the toll network, as the situation demands, and outpulse the new number to a distant office to complete the call.

U.S. Pat. No. 3,555,196, which issued to F. J. Singer on Jan. 12, 1971, discloses a programmed auxiliary control arrangement for upgrading crossbar type telephone offices with call-forwarding capability. Such a crossbar type office is disclosed in U.S. Pat. No. 2,585,904, which issued to A. J. Busch on Feb. 19, 1952. A crossbar office modified by the arrangement is described in the patent as completing functions similar to those described above for the ESS 1.

For parties not served by local offices with call-forwarding ability, call-diverting circuits are commercially available. These circuits attach to a station at a party's premises; in response to a completing call, such a circuit initiates a new outgoing call on a different line to a preselected number and eventually interconnects the two calls at the called party's premises.

In general, the arrangements described above have the ability to forward a call, under called party control, to any other compatible telephone station regardless of location. The telephone service offered, however, is limited. There are a host of other services that would be desirable to place under called party control to offer a more complete call completion service. For example, it is desirable to allow subscribers to control the denial of calls for any number of reasons. It may also be desirable to give the caller an indication of why a call is denied. This might be valuable in business relationships, for example, where a caller needs to have some expectation of when his party might be reached. In addition, a caller may wish to record the fact of the call and the identity of the caller so that the called party may return the call at the earliest possible moment. Called party controlled services of the past and present, such as call forwarding, do not offer such flexibility.

Call forwarding service has a number of other disadvantages. For example, subscribers today can activate, deactivate, and update forwarding numbers in their call-forwarding service only from their primary station. Thus, a subscriber normally residing in New York, but temporarily in California, cannot modify his call-forwarding service without enlisting the aid of another person having access to, say, his home phone. Not only is this inconvenient, but undesirable in terms of revealing information that the subscriber may wish to keep private.

Another practical difficulty inherent in conventional call-forwarding systems is that, in effect, two completely independent telephone connections are required to forward a call. The first connection is from the calling station to the local office serving the called party. The second connection is from that local office to the local office serving the forwarded number. In general, the quality of the overall connection is detrimentally affected by the average increased length of the connection. The factors contributing to this include transmission loss, increased signal distortion, increased echo, increased call setup time and the like. Moreover, the number of facilities, such as trunks and office supervisory and switching circuits, required to complete a forwarded call are undesirably increased. In an extreme case, for example, a call may be routed from the West Coast to the East Coast only to be forwarded to the West Coast again for completion. Add to this the alternate routing that may automatically occur in the telephone network during periods of dense traffic, disaster, and the like, and the potential practical difficulties of call-forwarding become evident.

SUMMARY OF THE INVENTION

The foregoing problems have been solved and a technical advance achieved in a method of providing person locator service. The method is implemented in a stored program controlled telephone system having a centralized data base and a data communications network interconnecting the data base with telephone switching offices. Information specifying the status of a telephone subscriber for call completing is stored at the centralized data base. The information includes a call completion number for completing calls to the subscriber if the subscriber is available for call completion. The status information may be modified at any time over a telephone and data communications network connection under direct control of the subscriber. The status information at the data base under the control of the subscriber includes a plurality of indications that specify, in general, that the subscriber is unavailable for receiving calls. The individual indications may each be associated with a different reason for the unavailability.

The data base is addressed to determine the status of the subscriber in response to an originating call directed to the subscriber. If the status information indicates that the subscriber is available for receiving calls, the call is completed to the call completion number stored at the data base.

A calling party is alerted as to the unavailable status of the called subscriber in response to the receipt of one of the unavailable indicators from the data base. In a preferred embodiment, the alerting is accomplished by an automated verbal announcement. The announcement may include a statement of the reason for the unavailability. A calling party alerted that a called subscriber is unavailable may request, by keying-in a special code from his station, that the subscriber return the call. In response to the special code, the caller's station number is transmitted to and stored at the data base.

At any time the subscriber may initiate an inquiry telephone call to the data base from any station to determine if any return call, or callback, requests are present. The stored numbers of parties that have requested callback are returned to a telephone office associated with the subscriber's inquiry call, preferably one at a time. The subscriber may ignore any such request or, if he wishes, have the telephone office automatically complete any one or all of the calls.

Many other features may be provided. For example, the call completion and callback features may be combined to provide a paging service. A call is completed to any number the subscriber wishes to initiate a paging alert to the subscriber. In addition, the calling party is notified of the page; the calling party may then request that his station number be stored for callback by the subscriber.

As a further example of other features, the subscriber may provide that all calls directed to him be on an automatic collect basis. Alternatively, the subscriber may allow restricted automatic collect in which only preselected parties may place calls to him on a collect basis.

The above and other features may be directly controlled by the subscriber; the data base update, call completion, callback, etc., may be performed without the assistance of operators or third parties. Even the whereabouts of the subscriber may remain unavailable to callers while they are still able to communicate with the subscriber or obtain information the subscriber permits regarding his status.

BRIEF DESCRIPTION OF THE DRAWINGS

The invention will be better understood from a reading of the following detailed description in conjunction with the drawings in which:

FIG. 5 shows one illustrative layout of a memory table located at the data base of FIG. 1 and containing station and other information pertaining to one subscriber of person locator service.

DETAILED DESCRIPTION

Figure 1:
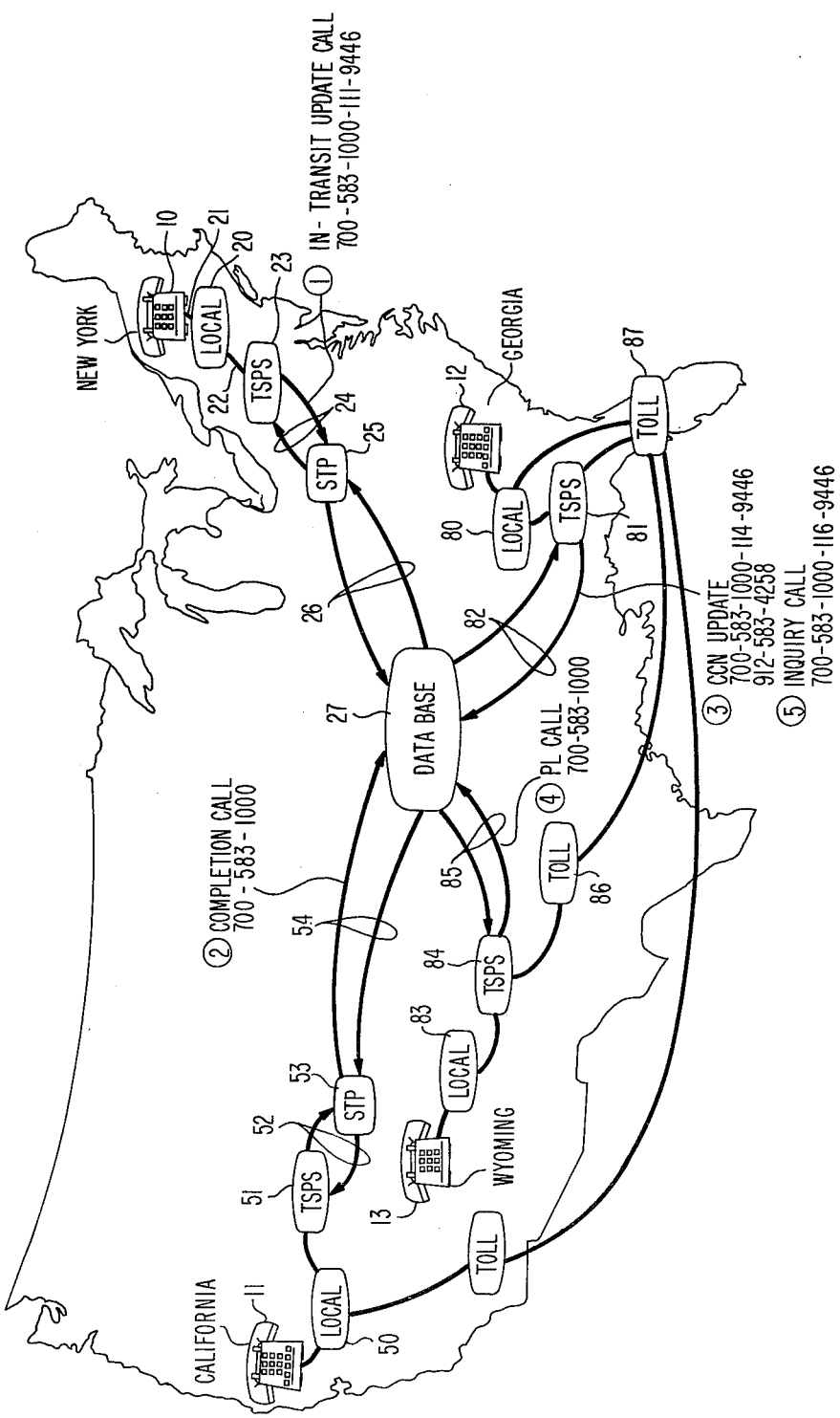
FIG. 1 shows, in block diagram form, a configuration of telephone switching offices, CCIS (Common Channel Interoffice Signaling) and signal transfer facilities together with one of several data bases illustratively for serving person locator calls in the United States.

With reference to FIG. 1, the method of providing person locator and enhanced services is described by assuming that a subscriber A, ordinarily located at station 10 in New York, subscribes to person locator service and is intending to travel to the location of station 12 in Georgia. Subscriber A has assigned to him a Person Locator Number (PLN), which is unique to him nationwide. The PLN is assumed to have been assigned to subscriber A when he initially subscribed to the service. Illustratively, the PLN is assumed to be a seven digit number personally identifying him. Alternatively, for example, person locator service might be provided using appropriate area codes and subscriber directory numbers.

Immediately prior to departing for Georgia, subscriber A may wish to provide that certain parties trying to call him while he is traveling be advised that he is in transit. To arrange this, subscriber A initiates a Person Locator (PL) in-transit update call. Assuming that subscriber A places the update call from station 10, in response to an off-hook condition at the station, connection is made to local office 20 over line 21 in the conventional manner. Office 20 extends dial tone, and subscriber A then keys in a "0" followed by the digits "700" and his PLN, which might be 583-1000, for example. The "700" digits identify this call as involving person locator service. This is one illustrative way of identifying such calles; other ways are possible as will be seen.

The initial digit "0" instructs office 20 to route the call via a Traffic Service Position System (TSPS). Office 20 therefore forwards the keyed-in digits 0-700-583-1000 over a trunk 22 to TSPS 23. A TSPS is an operator and automatic services facility described in detail in U.S. Pat. Nos. 3,484,560 to Jaeger et al, issued on Dec. 16, 1969; 4,031,324 to Dudonis, issued on June 21, 1977, and 4,054,756 to Comella et al, issued on Oct. 18, 1977. It comprises a processor, memory, software program, switching network, and other equipment for automatically handling certain types of calls. It also interfaces callers with operator positions for semi-automatic handling of calls which require operator assistance.

The initial digit "0" informs TSPS 23 that the calling party may wish to key-in other digits in addition to those already received by the TSPS. When TSPS 23 is ready to accept the additional digits, it prompts the caller, by dial tone, for example. If no additional digits are inputted, TSPS 23 routes the call to an operator. It is assumed, however, that in response to the prompt, subscriber A keys-in a three-digit access code and a four-digit number referred to as a PIN (Personal Identification Number) which are received by the TSPS.

The access code identifies the call as a certain type of PL update call and may, as assumed here, consist of the digits 111 for an in-transit update call. The PIN is assigned to subscriber A at the time of subscription to PL service and is assumed here to be the digits 9446; although not unique to subscriber A, the PIN is correlated with the unique PLN for verification purposes as will be seen.

In response to the "700" digits, the TSPS formulates a data message including the dialed information and transmits the message over a data link 24 to Signal Transfer Point (STP) 25 and thence via data link 26 to a centralized data base 27.

The data links 24 and 26, STP 25, and data base 27 form part of the CCIS system, which is essentially a packet data switching arrangement. Packet data switching facilities are disclosed, for example, in A. G. Fraser U.S. Pat. Nos. 3,749,845 of July 31, 1973 and 3,979,733 of Sept. 7, 1976. The structure and operations of the CCIS system are described in the 57 *Bell System Technical Journal* No. 2, page 230, et seq.

Data base 27, by way of example, may comprise a Western Electric Company, Inc., 1 A processor (disclosed in 56 *Bell System Technical Journal* No. 7, February 1977), equipped with disk storage and a system of programs to establish, edit, interpret, and manage information stored in memory. It is equipped via a peripheral unit bus (disclosed in 57 *Bell System Technical Journal* No. 2, February 1978) with facilities for interface communication with STP 25 and the telephone toll network.

STP 25 is a routing facility which may or may not be required in any given CCIS packet signaling connection. STPs other than STP 25 shown in FIG. 1 exist in the nationwide CCIS system. Their purpose is to provide economical data communication between the numerous telephone offices and data bases such as 27. An STP comprises a processor and memory facilities and a program to translate incoming data, such as the PL update call data, from telephone offices into the identity of the data base to which the data is to be routed. The STP is discussed in more detail in 57 *Bell System Technical Journal* No. 2, February 1978 at page 263, et seq.

In the example at hand, STP 25 translates the PLN digits of the data from TSPS 23 and recognizes that data base 27 is the location where person locator information is stored pertaining to the subscriber A. Accordingly, STP 25 forwards the data from TSPS 23 over data link 26 to the data base.

Data base 27 recognizes from the "700" digits that the received data pertains to a person locator type of call. Accordingly, program control is given to a person locator control program which is flowcharted in FIGS. 2 to 4. Program execution begins at program address PLSTART in FIG. 2.

Each subscriber whose person locator records are maintained at data base 27 has assigned a memory table in the data base memory. One illustrative organization of such a table for subscriber A is shown in FIG. 5. The address of the memory table is derived by the data base program from the PLN. Word 0 of the table may contain a COLLECT PIN which is assigned to a subscriber who wishes to be billed for calls to him from certain people. The people who may call toll free must be given the COLLECT PIN and the PLN by the subscriber. Word 1 of the table in FIG. 5 contains the subscriber PIN here assumed to be 9446. Word 2 may contain a call completion number, which is a area code and directory number of a station at which subscriber A wishes his calls completed if the service is active. Word 3 contains a number of control flags which direct the data base program and flags indicating the status of subscriber A. Briefly, flag AC (Automatic Collect) is a "1" if subscriber A wishes to accept charges on any or all calls directed to his PLN. Flag ACAC (All Calls Automatic Collect) is a "1" if subscriber A wishes to be charged for all calls directed to his PLN. The states of these flags are established at the time subscriber A subscribes to PL service. Although it would be straightforward to allow the subscriber to update AC and ACAC directly in accordance with the teaching below, this does not appear to be particularly useful for the collect feature.

The remaining flags in word 3 of the memory table are set and cleared by the data base program as needed in the processing of each PL call request. The ACA (Automatic Collect Allowed) flag is set to indicate that a PL call being processed is to be charged to subscriber A. The PLCA (PL Calling Active) is set or cleared in response to update calls from subscriber A to activate or deactivate person locator call completion. The ITF (In-transit) flag and the UNAV (Unavailable) flag are set in response to update calls from subscriber A and are used to initiate automatic verbal announcements to callers that subscriber A is in-transit or unavailable for calling. The meaning of and content of any announcement associated with flags, such as ITF and UNAV, is totally illustrative. Any number of such flags having any desired meaning may be provided. It may be desirable to provide, for example, a slumber flag and corresponding announcement. The PAF (Paging) flag is set in response to an appropriate update call from subscriber A and results in both an automatic announcement to a caller to the effect that subscriber A must be paged and the completion of a call to the number stored in word 2 of the table to perform the paging. Finally, the CB (Callback) flag is set whenever subscriber A initiates a callback sequence for the purpose of completing calls to those calling parties who have been given in-transit, unavailable, and paging announcements and who wish a return call. The directory numbers of these callers are stored in words 4 through N of the memory, which words comprise a callback queue.

Figure 2:
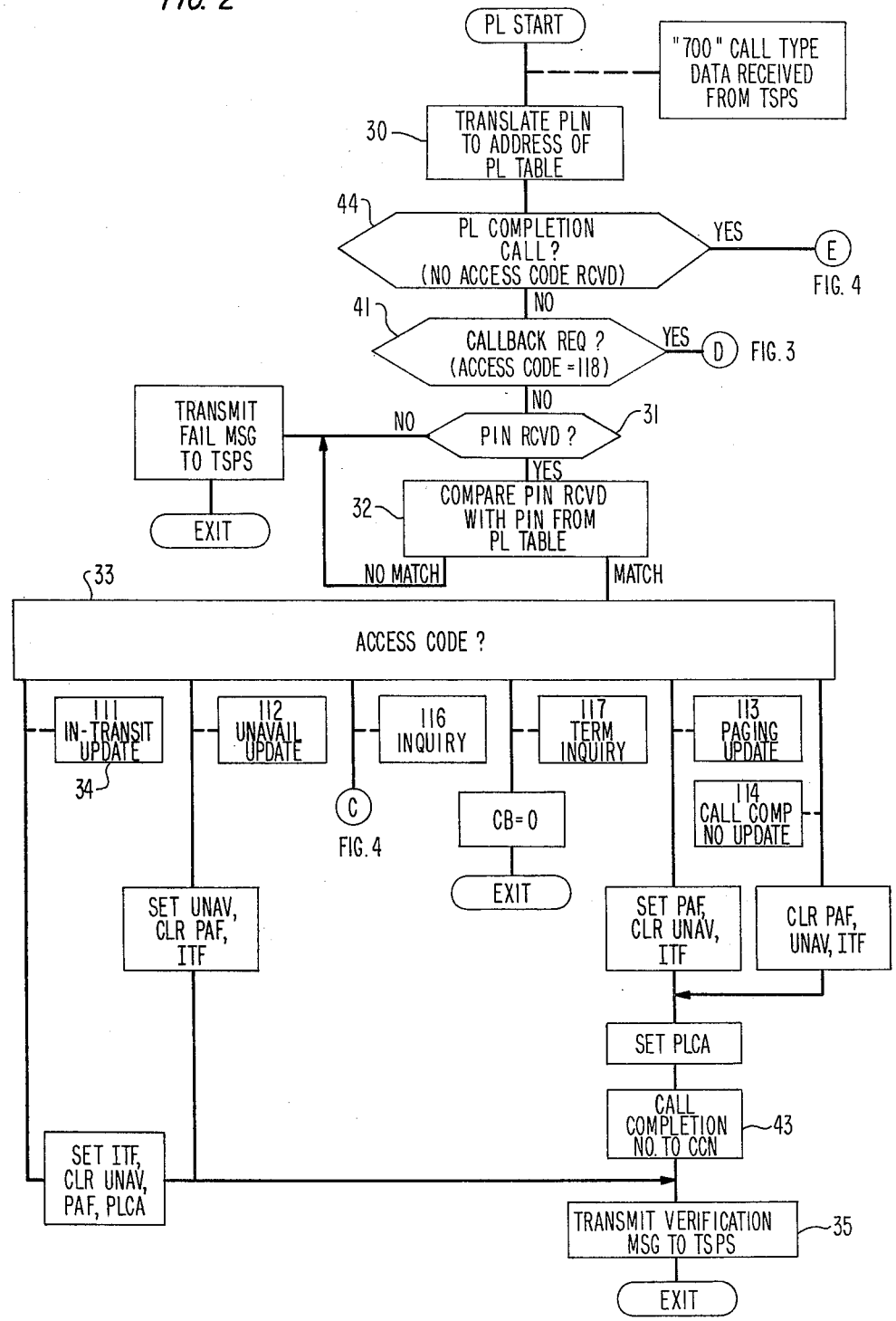
FIGS. 2 to 4 show illustrative flow diagrams of a person locator program at the data base of FIG. 1.

With reference again to our example in which subscriber A is placing an in-transit update call, in FIG. 2 the PL program first translates at designation 30 the received PLN 583-1000 into a memory address which is the address of the PL memory table in FIG. 5. Next, at designation 44 the access code received from TSPS 23 is examined to determine if this call is a completion call (no access code received), which is a call being placed to subscriber A from another party. Since the call in question is an in-transit update call from subscriber A, this test fails. At designation 41, the program next determines by examining the access code if a callback request is being initiated. The answer is no. All the remaining types of PL calls assumed in this illustrative embodiment require verification that only an authorized party is making them. Therefore, at designation 31 of FIG. 2, the data from TSPS 23 is examined to determine if a PIN was received. If not, the attempt is considered invalid, and an appropriate FAIL message is returned over data links 26, 24, and STP 25 to TSPS 23. Since a PIN is assumed to have been transmitted in this example, it is next determined if it is the correct PIN. At designation 32, the program uses the translated address of the PL memory table to obtain the correct PIN associated with subscriber A from word 1 and compares it to the PIN received from TSPS 23. Here, it is assumed that the correct PIN 9446 was received, and the program goes on to interpret at designation 33 the received access code. If the received PIN had not matched the stored PIN, however a FAIL message would have been returned to TSPS 23 and the call denied.

The result of interpreting the access code 111 at 33 results in the program taking the IN-TRANSIT leg at designation 34. In this leg, the program sets ITF and clears UNAV, PAF, and PLCA in word 3 of the PL memory table. The setting of ITF indicates that the subscriber wishes an announcement to be given to each subsequent PL caller that he is in-transit. The clearing of PLCA indicates that call completion for this subscriber is no longer active. The clearing of UNAV and PAF insures that subscriber unavailable announcements and paging operations will not erroneously be performed in response to calls to the subscriber.

Finally, at designation 35, the PL program formulates a verification message and transmits it to TSPS 23. The verification message includes an indication that the in-transit update has been performed. TSPS 23 may be arranged to provide an announcement to subscriber A to this effect if desired. At this point, all data base operations pertaining to the call are completed. The PL program releases control at EXIT to the main control program of the data base.

From this point on until the information stored at data base 27 is again updated, all calls directed to PLN 583-1000 will result in an appropriate announcement being given to a caller rather than in the completion of a call. In addition, provision will be made to store the station numbers of calling parties, if they desire, for subsequent callback by subscriber A, as will be seen.

For example, assume now that while subscriber A is enroute from New York to Georgia, a caller B at station 11 in California initiates a PL completion call to subscriber A. Caller B keys into local office 50 from station 11 the digits 700-583-1000. This number may be prefixed by a "1" in certain areas of the country. The "700" digits direct local office 50 to outpulse the keyed-in digits to a local TSPS, which happens to be TSPS 51. The "700" digits inform TSPS 51 that the call is a PL type of call. The digits 583-1000, of course, form the PLN of subscriber A. TSPS 51 formulates a data message containing the "700" and PLN digits and transmits the message to STP 53. STP 53 directs the data message to data base 27. This is illustrated in FIG. 1 by the transaction designated as 2.

With reference again to FIG. 2, the data base program, after translating the PLN into the PL memory table address, at designation 44 determines from the absence of an access code that a completion call is being placed to the PL subscriber. At this point, the program determines by examining indicators AC and ACAC in word 3 of the table whether or not automatic collect billing is in effect for subscriber A. This part of the flow diagram is shown at E in FIG. 4. The indicator AC will have been set to the binary state "1" if subscriber A wishes to accept the charges for certain PL calls placed to him by certain parties. In addition, the indicator ACAC will have also been set to "1" if subscriber A wishes to accept charges for all PL calls to him. In the event that subscriber A wishes to accept the charges on some, but not all, calls, the PIN keyed by the calling party must be checked to determine if the caller is authorized by A to place collect calls. This is shown at designation 36 of FIG. 4. If AC is not set to "1," the program allows the call. The calling party will be charged. The program also allows the call if AC="1" and ACAC="1," meaning that all calls are to be charged to subscriber A. In the latter case, flag ACA in word 3 of the memory table is set to "1" to indicate that subscriber A is to be charged for the call. If subscriber A accepts some charges (AC=1), but not on all calls (ACAC=0), the program checks the PIN keyed by caller B to determine if B is a party authorized to place collect calls. By way of example, if no PIN was received, the call is allowed but will be charged to B. The call is denied if a PIN keyed by B does not match the COLLECT PIN stored in word 0 of the memory table. If the PINs match, however, subscriber A will be charged, and indicator ACA is set to "1."

Figure 3:
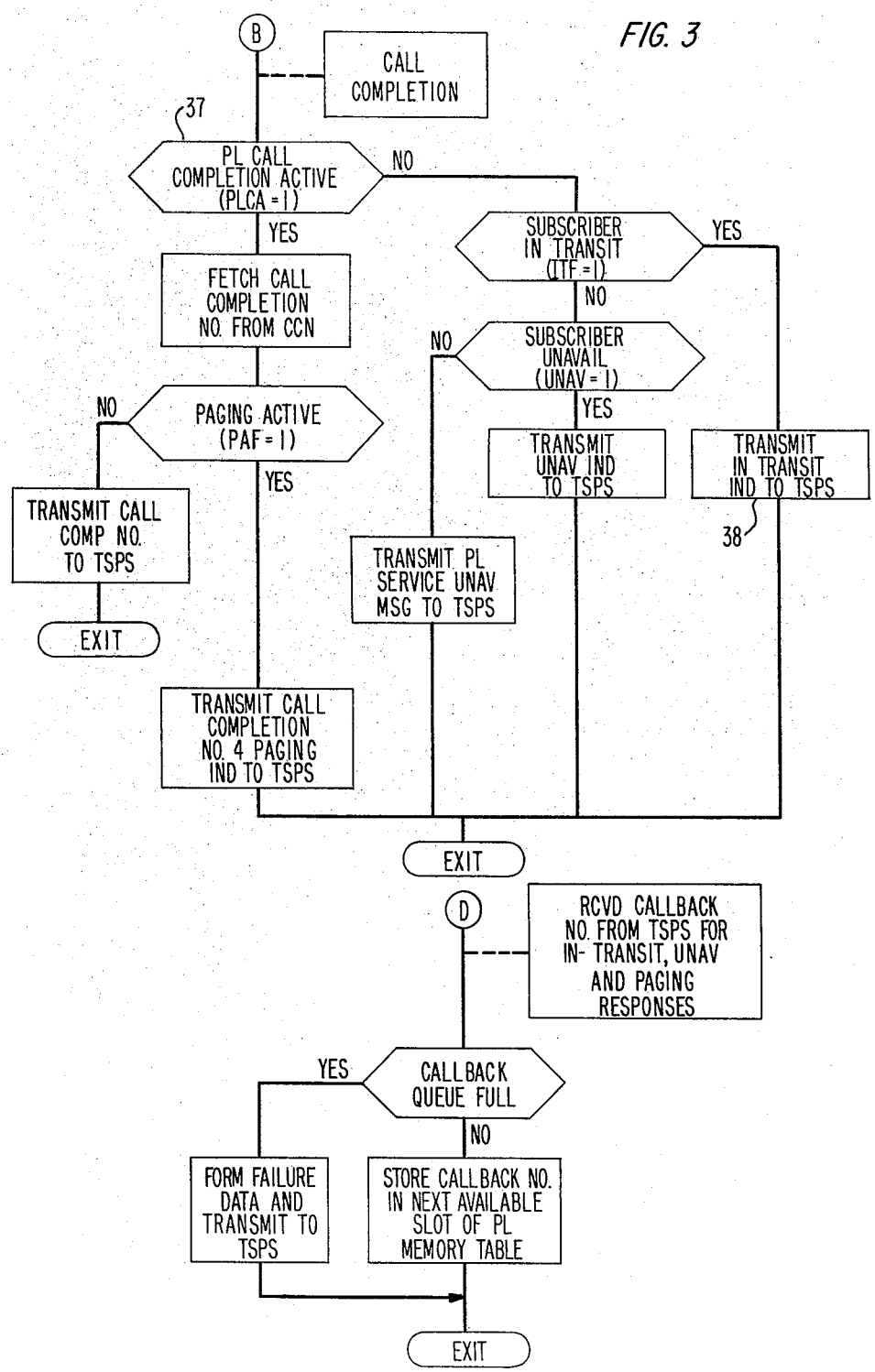
Figure 4:
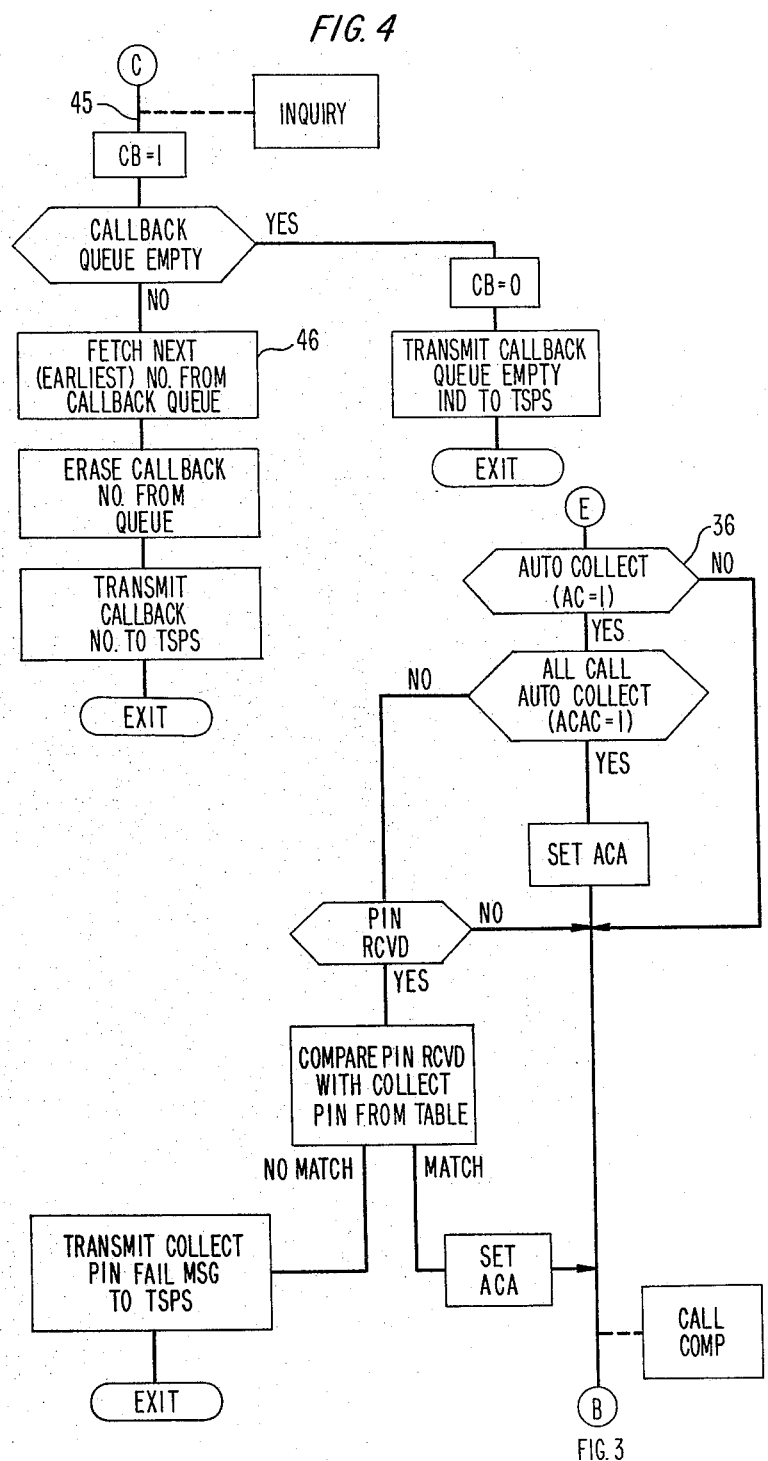

At designation 37 in FIG. 3, the program determines by examining PLCA if a call can be completed to subscriber A. In the example at hand, the answer is no. The program next examines the ITF flag to determine if subscriber A is in-transit (ITF="1"). ITF is set to "1" as a result of the update call from subscriber A described earlier. The program therefore formulates a verification message as shown at designation 38, including an "in-transit" indication. The message is transmitted to TSPS 51, after which the PL program returns to the main program at EXIT.

Figure 6:
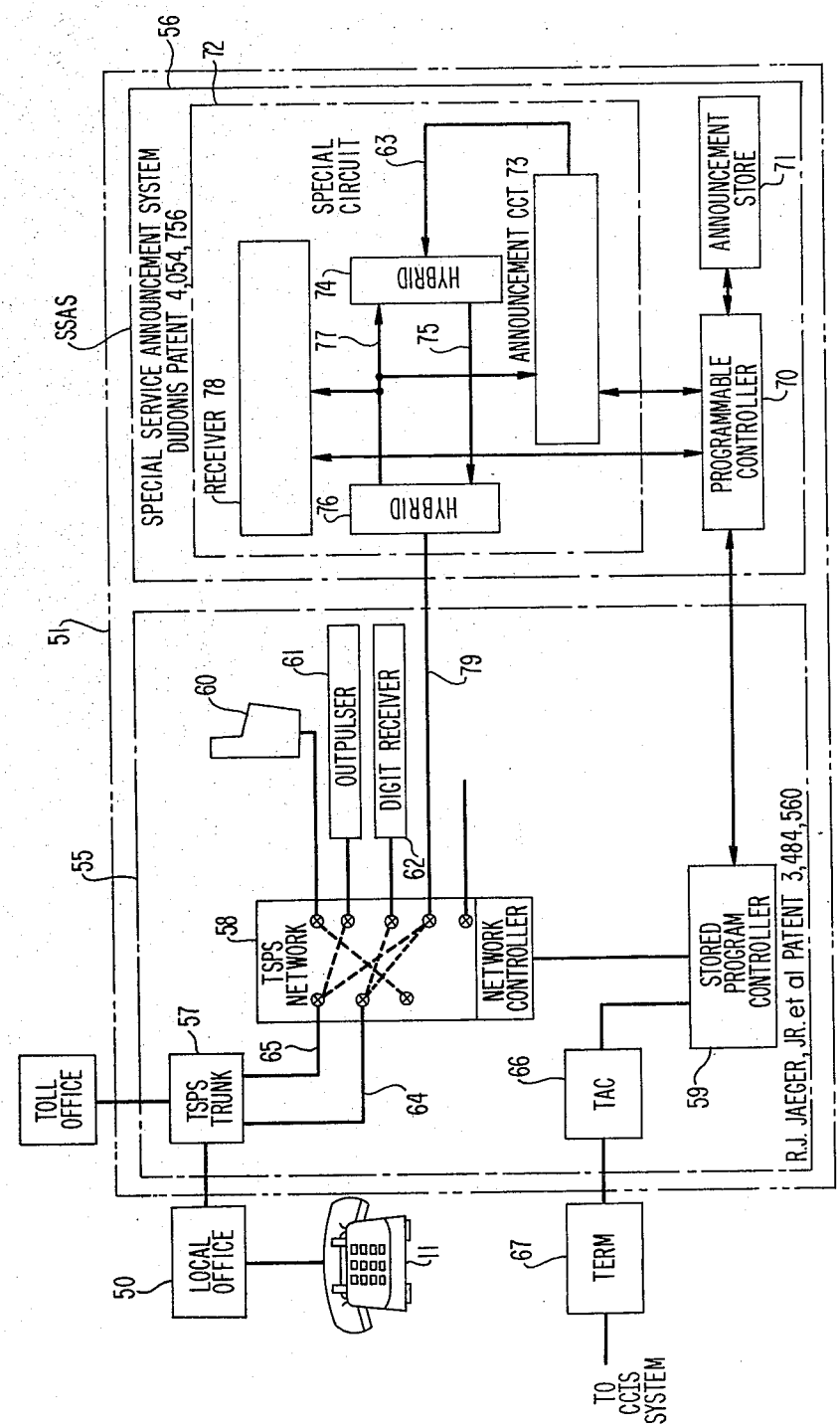
FIG. 6 shows, in block diagram form, a Traffic Service Position System, which is one type of office shown in FIG. 1 having access to the CCIS system.

TSPS 51 receives the verification message including the "in-transit" indication and makes an appropriate announcement to the calling party B. FIG. 6 illustrates TSPS 51, as well as other TSPSs, in block diagram form. The fundamental structure, which is described in R. J. Jaeger, Jr., et al, U.S. Pat. No. 3,484,560 is depicted inside box 55. A Special Service Announcement System (SSAS), which is described in U.S. Pat. No. 4,054,756 to Comella et al, is depicted in 56. SSAS 56 is arranged to provide automatic verbal announcements, such as the "in-transit" announcement, to subscribers in response to specified stimuli.

TSPS 51 connects to local office 50 via trunk circuit 57 in FIG. 6, which in turn has split incoming and outgoing appearances 64 and 65 on the input side of network 58. Network 58 is controlled by a Stored Program Controller (SPC) 59 to connect input trunk appearances to service circuits and operator positions such as 60, 61, and 62, located on the output side of the network. SPC 59 also has access to a Terminal Access Circuit (TAC) 66 which, in turn, communicates with a terminal 67 to interface with the CCIS system. Terminal 67 operates essentially like a modem to interface with the bit stream of the CCIS data links. TAC 66 acts as a data buffer between the SPC and the CCIS system.

SSAS 56 also has a plurality of appearances, such as 79, on the output side of network 58. By means of an appropriate network 58 connection, the appearance 79 may be connected to the local office connection 64 of the trunk circuit 57 and in this way be used to provide subscriber announcements.

As shown in FIG. 6 and described in detail in U.S. Pat. No. 4,054,756, SSAS 56 comprises a Programmable Controller (PC) 70, which interacts with an announcement store 71 and special circuit 72 to provide verbal announcements.

Announcement store 71 stores binary announcement information used to generate speech segments of 512 milliseconds each. These segments are called half-second segments. Subscriber announcements are generated by selectively combining various half-second segments. For example, words such as "one," "two," "three," "minute," and "credit" are generated as half-second segments. Longer words are generated by combining one or more half-second segments. For example, the words "eleven," "thirteen," and "thank you" are generated from 2 half-second segments.

Each of the half-second segments is stored in 400 consecutively addressed memory locations, each including a 40-bit data word, in announcement store 71. Thus, each half-second segment is encoded in 16,000 binary bits. These bits are retrieved one word at a time under control of PC 70 and applied serially to announcement circuit 73. Announcement circuit 73 converts the digital bit stream into an analog speech signal which is heard by a calling party via the route consisting of path 63, hybrid 74, path 75, hybrid 76, network appearance 79, network 58, trunk appearance 64, and trunk circuit 57. The reader is referred to U.S. Pat. No. 4,054,756 for further details of the operation of SSAS 56.

Returning now to our example, it is recalled that the last operation that transpired in the PL call from caller B at station 11 in FIG. 1 to subscriber A was a data message from data base 27 to TSPS 51 indicating that subscriber A was in-transit. In response to the data message, SPC 59 controls PC 70 to generate a speech announcement to subscriber B at station 11. If local office 50 has Automatic Number Identification (ANI) and has supplied TSPS 51 with the number of station 11, the announcement might be "The party you are calling is in transit. If you wish the party to return your call upon arrival, at the tone depress the asterisk key. If you wish a return call to another station, at the tone key-in the area code followed by the 7-digit directory number." On the other hand, if local office 50 has not supplied TSPS 51 with the calling number, the announcement might be "The party you are calling is in-transit. If you wish to leave your number, the party may return your call upon arrival. If you wish this service, at the tone key-in your area code followed by your 7-digit directory number." A prompting tone is then generated by SSAS 56. Subscriber B may simply hang-up station 11 if desired, in which case the call is terminated in conventional fashion. Assuming, however, that local office 50 does not have ANI and subscriber B wishes to have subscriber A return his call, subscriber B keys-in his number, which might be, for example, 503-526-6789.

The keyed-in digits are received by SSAS 56 over the route consisting of trunk circuit 57, network 58, appearance 79, hybrid 76, appearance 77, and receiver 78. PC 70 receives the digits from receiver 78 and communicates them to SPC 59. In response, SPC 59 forms a data message consisting of subscriber A's PLN, an access code 118 identifying the message as a request to store a callback number and the directory number received from subscriber B. The data message is transmitted to data base 27, and the PL program in FIG. 2 to 4 again executed. At designation 41 in FIG. 2, the program identifies the 118 access code and, in response, stores the directory number of subscriber B in the next available slot of the callback queue shown in FIG. 5. In the event the callback queue happens to be full, the program returns a failure data message to TSPS 51 which, in turn, causes an appropriate announcement to subscriber B.

Assume now that subscriber A has arrived at the location of station 12 in Georgia. He may first wish to update his listing at data base 27 to reflect this fact. To do so, he keys-in the digits 0-700 and his PLN. Upon receiving a prompting tone from TSPS 81, A keys-in the access code 114, specifying that the call is to update his call completion number, and PIN 9446. TSPS 81 receives the area code and directory number of station 12 (assumed to be 912-582-4258) from local office 80 by means of its Automatic Number Identification (ANI). This data is forwarded to data base 27 in a manner as previously described and as shown by designation 3 in FIG. 1.

The PL program at designation 33 in FIG. 2, recognizes the access code 114 and responsively clears the paging, unavailable, and in-transit flags, PAF, UNAV, and ITF. The program then sets PLCA to "1" to activate the call completion function. At designation 43, the program stores the received call completion number 912-582-4258 in word 2 of the memory table in FIG. 5. A verification message is formed and returned to TSPS 81, and the update transaction is complete.

All calls nationwide now directed to subscriber A's PLN will automatically be routed to station 12 in Georgia. For example, assume that a caller C located at station 13 in Wyoming desires to call subscriber A and keys into local office 83 the digits 1-700 followed by PLN 583-1000. The call is routed from local office 83 to TSPS 84 and then over data link 85 to data base 27 as shown by designation 4 in FIG. 1. At designation 44 in FIG. 2, the data base program recognizes the absence of an access code as requesting call completion; after determining whether the call is to be billed to subscriber A or to subscriber C (FIG. 4), the program proceeds to designation 37 in FIG. 3. Since PLCA has been set to "1" on the previous update by subscriber A, the program determines that call completion is active. The call completion number 912-582-4258 is retrieved from word 2 of the memory table of FIG. 5; since paging is not active (PAF=0), the program forms a data message containing the call completion number and transmits the message to TSPS 84 over data link 85. The message also contains an indication of whether to charge subscriber A or subscriber C for the call. At this point, the transaction is complete insofar as data base 27 is concerned. The Stored Program Control (SPC) of TSPS 84 receives the call completion digits from the CCIS system. The SPC treats the call completion number as it would any originating number and forwards the call in a conventional manner to its destination. Here, it is assumed that the conventional forwarding is via toll offices 86, 87, and local office 80 to station 12. Under the assumption that the call is answered, an automatic message accounting entry is eventually made on magnetic tape by TSPS 84 when the call is terminated, charging the call to the previously indicated party A or C.

In the example above, subscriber A updated his call completion number from the station at which he wished his calls completed. He could have had his calls completed to any station even though he was not at that station. To do this, subscriber A would dial "0" to tell a TSPS to expect more than 10 digits, "700," and the PLN. After a second dial tone is received from the TSPS, he would dial a special access code, his PLN, and finally the station number to which his calls are to be transferred. For simplification, this access code option is not shown in the drawing.

Even though subscriber A can generally be reached at the Georgia station, he may be temporarily unavailable to answer an incoming call for any number of reasons. In many cases, these unavailable periods are sufficiently brief so that it is inconvenient to require him to update his status at the data base in order to provide the service of storing callback requests. In accordance with the invention, this feature is provided automatically if the calling party wishes. Assuming, for example, that the completion call from caller C to subscriber A is not answered, caller C may request callback service by "flashing" his switchhook. TSPS 51 is arranged to recognize the "flash" and, in response, to connect a digit receiver, such as 62 in FIG. 6, to the connection to subscriber C. Caller C may now depress the asterisk key on his station if he desires to store a callback request. TSPS 51 is aware of the state of the call from caller C to subscriber A, having retained the call state in a call register in accordance with conventional practice. In this situation in which subscriber A has not answered the completion call, TSPS 51 interprets the asterisk key signal to request callback. If TSPS 51 has been provided the calling station number by local office 50, the TSPS formulates a callback data message including C's station number and transmits it to data base 27 for storage as already described. Otherwise, the TSPS connects SSAS 56 to the connection and verbally prompts subscriber B to key-in his station digits before forming the data message.

Sometime after subscriber A arrives at station 12 in Georgia, he may wish to determine if any callers left return call requests while he was enroute from New York. As we know from the previous discussion, at least one such call occurred from caller B at station 11. To do so, subscriber A initiates an inquiry call by keying-in the digits 0-700-583-1000 and 116-9446 after receiving second dial tone.

The digits 116 form the access code indicating an inquiry call; the digits 9446 form subscriber A's PIN. In this example, this data is received by local office 80 and forwarded to data base 27 as illustrated by designation number 5 in FIG. 1.

The program at data base 27 compares the received PIN with the authorized PIN from the memory table as before described to verify that only a proper party is placing the call. At designation 33 in FIG. 2, the 116 access code is recognized, and program control is transferred to designation 45 in FIG. 4. At 45, CB is set to "1" to indicate that a callback sequence is in progress, and the callback queue shown in FIG. 5, associated with the memory table for subscriber A, is interrogated to determine if any callback entries are present. If the queue is empty, CB is reset to "0"; an empty indication is returned to TSPS 81, and an appropriate announcement is made to subscriber A by the TSPS. In the event that one or more callback requests are stored in the callback queue, however, the program removes the directory number of the oldest request from the queue and transmits it to TSPS 81 by means of a data message. The data message may also include an indication of the number of requests remaining in the queue.

In response to the data message, TSPS 81 performs a verbal announcement to subscriber A, which includes the caller's directory number and the number of requests remaining in the queue. Subscriber A may direct TSPS 81 to complete the call, or he may direct TSPS 81 to request the next stored request, if any, from data base 27. For example, assuming that the callback request from caller B is the only entry in the callback queue, the program at designation 46 removes B's directory number entry from the queue and transmits it in a data message to TSPS 81. TSPS 81 provides the directory number to subscriber A by means of an announcement in a manner as already described. The announcement might be as follows: "You have been requested to call the party at area code 503 and directory number 526-6789. (Pause) Area Code 503 and directory number 526-6789. (Pause) No (one, two, etc.) more request(s) remain. If you wish to call the quoted number, at the tone depress the asterisk key. Otherwise, depress the zero digit key for the next request." At this point subscriber A may hang up if he wishes, or he may depress the asterisk key after TSPS 81 generates the prompting tone to have the call automatically completed. In the event subscriber A depresses the zero digit key, TSPS 81 transmits another data message including the PLN, inquiry access code, and PIN to data base 27. In response, the data base program performs the same program steps described above on an inquiry call and returns to TSPS 81 an indication that the callback queue is empty in this particular example. Subscriber A then receives an announcement from TSPS 81 as above stating that no more callback requests are present.

Assuming that subscriber A depresses the asterisk key, TSPS 81 proceeds to establish a call connection in the conventional manner as if the call completion number had been received directly from subscriber A on an originating call. This call connection is not shown in FIG. 1.

TSPS 81 retains in its memory information, such as subscriber A's PLN and PIN, regarding this callback sequence initiated by subscriber A. At the termination of the call from subscriber A to caller B, subscriber A may simply hang up. In this event, TSPS 81 transmits a data message to data base 27 to terminate the inquiry process. The message contains the terminate access code 117. Upon receiving the message, the data base 27 program at designation 33 in FIG. 2 recognizes the access code and sets the callback in progress flag CB to "0." This terminates the callback procedure. Any unquoted callback requests that are still in the callback queue remain there for quotation during the next inquiry from subscriber A.

At the termination of the call from subscriber A to station 11, subscriber A may "flash" his switch-hook instead of hanging up. In response to the "flash," TSPS 81 forms another inquiry data message having the inquiry access code 116 and transmits the message to data base 27. In the same manner as described above, the data base program at designation 33 of FIG. 2 recognizes the 116 access code and proceeds at 45 in FIG. 4 to transmit to the TSPS the next callback number, if any, from the queue. The callback process described above continues until terminated by subscriber A by his hanging-up.

The combination of person locator call completion and callback taught above may be advantageously used to offer other special services, such as paging, to telephone subscribers. Paging service may be offered, for example, as follows. Assume subscriber A intends to be working in the vicinity of local office 20 on a given day but without immediate access to a telephone. For purposes of discussion, assume also that local office 20 is equipped with radio paging facilities. The paging facility might be, for example, the BELLBOY 150 megacycle personal signaling system described in the January 1965 issue of the *Bell Laboratories Record* at page 23 (BELLBOY is a registered trademark of the American Telephone and Telegraph Company, Inc.).

Before leaving for work, subscriber A initiates an update call to designate a special paging telephone number that has been assigned to him as part of his paging service subscription. The update call is substantially the same as that described earlier, except that a special access code, which might be 113, for example, is included. In this case, subscriber A keys-in the digits 1-700-(PLN) and 113-(PIN)- (special paging number) after a second dial tone. The digits are transmitted to data base 27 as part of a data message as hereinbefore described. The access code is decoded at designation 33 of the data base program in FIG. 2. In response to the code, the program sets the paging flag PAF in subscriber A's memory table and clears the unavailable and in-transit flags UNAV and ITF. The program also activates call completion service by setting flag PLCA and stores the paging number in word 2 of the memory table.

Now when any party places a call completion person locator call to subscriber A's PLN, as described above, the paging number is returned from the data base. In addition, a paging indication is returned in the data message to the originating TSPS in question. In response to the paging indication, the TSPS performs an announcement to the caller to the effect that the called party will be paged and that the caller may have his directory number stored for callback if desired. The call may be terminated at the TSPS if the caller chooses not to request callback. Alternatively, it may be decided as part of the system design to page subscriber A regardless of the calling party's action. Assuming that callback is requested, the caller's directory number is transmitted in a data message to data base 27, as hereinbefore described. The TSPS completes the call forward using the special paging number received from the data base. The call is routed in conventional fashion to office 20 in this assumed case. Office 20 recognizes the call as a paging type of call because of a portion of the digits of the paging number. The office translates the last 4 digits of the paging number into a number that will be uniquely decoded by a receiver which subscriber A is carrying on his person. Office 20 then repetitively radio transmits the number assigned to the receiver. In response, subscriber A's receiver buzzes to alert him to the paging request.

Subscriber A may now, at his convenience, locate a telephone and respond to the page. He may know, for example, that only his secretary may page him, in which case he merely calls the secretary. On the other hand, if other parties have his PLN, he may initiate an inquiry call as described above to determine the caller and return the call.

Numerous other enhancements may be provided by person locator service. For example, the Voice Storage System (VSS), described briefly in an article entitled "New Custom Calling Services"; *International Switching Symposium;* Paris, Fr.; May 7-11, 1979; Session 50B, may be used to provide personalized recorded messages to person locator callers. The call completion number stored at the data base may direct the completion of a person locator call to a termination in a VSS. The VSS may respond with a personal message from subscriber A in place of the prior built-in announcements discussed.

As another enhancement, an announcement of the call completion number, for example, may be provided to a subscriber who has forgotten it or to a relative of a subscriber who wishes to know if the subscriber traveled safely to a destination but does not wish to disturb the subscriber.

Person locator service may also be extended to international calls that can be otherwise dialed directly by merely allowing the storage at a data base of a sufficient number of digits at the data base.

A market tracking service could be offered to businesses. Advertisers might publish, for example, different PINs in different magazines. Person locator calls directed to the advertiser could be automatically sorted and tabulated at the data base on the basis of the PIN and the results provided to the advertiser.

An alternative signaling arrangement may be provided which is particularly useful for providing person locator service to callers who do not know or who have forgotten the PLN of a subscriber. This arrangement is illustratively based on using the area code and directory number of a subscriber as the PLN rather than a "700" type number. If the subscriber wishes, he may specify that a caller be allowed access to the data base on the basis of the subscriber's area code and directory number. The program would translate the area code and directory number into a memory table address in a manner similar to the translation of an arbitrary PLN. The caller might dial, for example, the digit "0" followed by the area code and directory number of the subscriber, plus a special access code after receiving the second dial tone. The "0" routes the call to a TSPS. The access code causes the TSPS to forward a data message to the data base. In effect, the message asks whether or not the party identified by the area code and directory number subscribes to person locator service and allows this type of casual person locator service. If the answer to both questions is yes and the subscriber has stored a call completion number at the data base, this number may be returned to the TSPS and the call completed as hereinbefore described.

It is to be understood that the above-described arrangements are merely illustrative of the application of the principles of the invention and that numerous other arrangements may be devised by those skilled in the art without departing from the spirit and scope of the invention.

We claim:

1. A method of providing person locator service in a telephone system comprising a plurality of stations, a plurality of telephone offices, a centralized data base, and a data communications network interconnecting said data base and said offices, said method being characterized by the steps of under direct control of a telephone subscriber, storing at said data base information specifying: person locator service active status for said subscriber for telephone call completion, a call completion number for completing calls to said subscriber if the subscriber is available for call completion, and in-transit status of said subscriber if said subscriber is unavailable for receiving a call, responsive to a call from a first one of the stations to said subscriber and received at a first one of said offices, addressing said data base to examine the stored information, responsive to the receipt of the call completion number from said data base indicating that said subscriber is available for call completion, completing the call from said first office to the call completion number, and responsive to a receipt of in-transit status information, supplying an in-transit signal to said first one of said stations.

2. The invention of claim 1 further comprising the step of storing the first station telephone number at the data base responsive to a nonanswer of the call from the first office to the call completion number.

3. The invention of claim 1 wherein the data base comprises a memory table (FIG. 5) uniquely associated with the subscriber having a first storage location (word 2), and the storing step comprises receiving the call completion number from the subscriber by means of the data communications network, and entering the call completion number into the first storage location.

4. The invention of claim 1 further characterized by the steps of responsive to a signal from said first station following said supplying of said in-transit signal, sending the telephone number of said first station from said first one of said offices to said data base, and storing at said data base said first station telephone number received from said first one of said offices.

5. The invention of claim 4 further characterized by the steps of addressing said data base responsive to an inquiry telephone call from a caller at a second one of said offices, receiving from said data base the stored telephone number of said first station, informing said caller of the received first station telephone number, and responsive to a signal from said caller and said received first station telephone number, completing a call connection for said caller to said first station.

6. The invention of claim 5 wherein the informing step comprises performing an automatic verbal announcement of the first station telephone number to said caller.

7. A method of providing person locator service in a telephone system comprising a plurality of stations, a plurality of telephone offices, a centralized data base, and a data communications network interconnecting the data base and the offices, said method being characterized by the steps of under direct control of a telephone subscriber, storing at the centralized data base information specifying the status of the subscriber for telephone call completion and a call completion number for completing calls to the subscriber if the subscriber is available for call completion, responsive to a call from a first one of the stations to the subscriber received at a first one of the offices at the originating end of the call, addressing the centralized data base to determine said status of the subscriber, responsive to the receipt of the call completion number from the data base indicating that the subscriber is available for call completion, completing the call from said first office to the call completion number, responsive to the receipt of status information from the data base indicating the unavailability of the subscriber for call completion, alerting the first station of the unavailable status, wherein the data base comprises a memory table uniquely associated with the subscriber having a frist storage location, and the storing step comprises receiving the call completion number from the subscriber by means of the data communications network, and entering the call completion number into the first storage location, the memory table comprises a plurality of further storage locations each signifying a different reason for the unavailability of the subscriber for call completion, and the storing step further comprises receiving the status information from the subscriber and setting the further storage locations in accordance with the status information.

8. The invention of claim 7 wherein the alerting step comprises transmitting from the data base to the first office an indication of the status of the subscriber in accordance with the state of said further storage locations, and at the first office, performing an automatic verbal announcement to the first station in accordance with the indication.

9. The invention of claim 8 wherein the memory table further comprises another storage location (word 4) and the method further comprises the steps of receiving a signal from the first station responsive to the alerting announcement, transmitting the number of the first station from the first office to the data base responsive to the signal, and storing the number of the first station in the other location.

10. The invention of claim 9 wherein the method further comprises the steps of transmitting an inquiry request from a second office to the data base responsive to an inquiry call from the subscriber at the second office, reading the first station number from the other storage location of the memory table responsive to the inquiry request, and transmitting the first station number from the data base to the second office.

11. The invention of claim 10 wherein the method further comprises the step of completing call connection from the second office between the second station and the first station.

12. The invention of claim 10 wherein the invention further comprises the steps of performing an automated verbal announcement of the first station telephone number to the second station, and completing call connection from the second office between the second station and the first station responsive to a prescribed signal from the second station.

13. In a telephone system comprising a plurality of stations, a plurality of telephone switching offices, a centralized data base, and a data communications network interconnecting the data base and the offices, a method for providing person locator service, characterized by the steps of forwarding to the centralized data base a telephone number and a person locator number received on a person locator update call from a first station, storing at the data base the telephone number in conjunction with the person locator number, forwarding the person locator number to the data base responsive to a person locator completion call at one of the offices from a second station directed to the person locator number, retrieving the telephone number from storage at the data base for a person locator call by using the person locator number, returning the telephone number to said one of the offices, and forwarding said last-mentioned call from said one of the offices using the returned telephone number.

14. The invention of claim 13 wherein said method further comprises the steps of storing at the data base a special service status indication in conjunction with the person locator number responsive to receipt of a special service code on the person locator update call, returning the special service status indication to said last-mentioned office responsive to the person locator completion call, transmitting an announcement from said last-mentioned office to the second station responsive to the special service status indication, storing the telephone number of the second station at the data base in conjunction with the person locator number responsive to a signal received from the second station as a result of the announcement, retrieving the telephone number of the second station from the data base responsive to a person locator call-back call directed to the person locator number from another one of the stations, and automatically completing a call connection from the last-mentioned station to the second station.

15. A method of providing person locator service in a communication system comprising a plurality of stations, a plurality of communication offices, a data base, and a data communications network interconnecting said data base with at least one of said offices, said method being characterized by the steps of:

storing at said data base information received from said one of said offices and specifying: a person locator service activity status for a subscriber for call completion, a call completion number for completing calls to said subscriber, and a plurality of different unavailability conditions for said subscriber sent to said data base from said one of said offices;

addressing said data base to examine the stored information therein in response to a call from a first one of said stations to said subscriber, and determining at said data base in response to said information examining whether said call is to be completed from said first one of said stations through said first one of said offices to a second one of said stations identified by said call completing number.

16. The invention of claim 15 wherein said plurality of different unavailability conditions for said subscriber includes a temporarily unavailable condition of said subscriber to answer said call at said second station, and said storing step includes receiving an in-transit signal sent under control of said subscriber to said data base and entering information specifying said in-transit condition into a storage means at said data base.

17. The invention of claim 16 wherein said temporarily unavailable condition includes an in-transit status of said subscriber and said determining at said data base identifies in response to the stored in-transit signal that said call from said first one of said stations to said second one of said stations cannot presently be completed, and further comprising the steps of sending from said data base to said one of said offices a coded message indicating the in-transit status, and at said one of said offices supplying in response to a receipt of said message, an audible announcement for said first one of said stations signifying the in-transit condition of said subscriber.

18. The invention of claim 17 further characterized by the steps of receiving at said data base from said first office a number identifying said first one of said stations, storing the first station identifying number at said data base, reading the stored identifying number in response to an inquiry call from said subscriber, and sending the read identifying number to said subscriber.

19. The invention of claim 18 further wherein said sending of said read identifying number comprises supplying an audible announcement of said identifying number from said first office to said subscriber, and further characterized by the step of receiving a call-back signal from said subscriber, and completing a call-back connection between said first one of said stations and a station serving said subscriber.

20. The invention of claim 15 wherein said plurality of different unavailability conditions for said subscriber includes a subscriber paging status indication and further characterized by examining at said data base said suscriber paging indication stored thereat in response to a person locator call to said subscriber from a calling one of said stations, and sending from said data base a coded message for effecting a transmission of a paging message to said calling one of said stations advising that said subscriber is to be paged following a completion of a call connection from said calling one of said stations to said second one of said stations.

21. A method of providing person locator service in a communication system comprising a plurality of telephone stations, a plurality of telephone offices serving said stations, a data base, a TSPS office, and CCIS facilities for data communication between said data base and said TSPS office, said method being characterized by the steps of:

storing at said data base information received over said CCIS facilities from said TSPS office, said information specifying: the person locator service active for an entitled customer, a call completion number identifying a first one of said stations at which said customer is to receive calls, and a plurality of different status indications defining different service conditions under which said customer is to receive calls at said one of said stations;

addressing said data base to examine the stored information therein in response to control signals sent to said data base from said TSPS office over said CCIS facilities during a call from a second one of said stations to said entitled customer, and completing a call connection between said first and second ones of said stations following the examining of said stored information.

22. The invention of claim 21 further characterized by sending to said data base for storage a status service condition message indicating that said entitled customer is in-transit, and registering at said data base call-back data for subsequent calls directed to said entitled customer during the storage of the in-transit message at said data base.

23. The invention of claim 22 further characterized by withdrawing said stored in-transit message from storage during an up-date call from said entitled customer, and subsequently entering into storage at said data base a prescribed one of said different status indications to indicate the unavailability of said entitled customer to answer an incoming call.

24. The invention of claim 21 wherein a prescribed one of said different status indications comprises a customer paging indication and further characterized by examining at said data base said customer paging indication in storage thereat in response to a person locator call to said entitled customer from a calling one of said stations, and sending from said data base a CCIS message for effecting a transmission of a paging message to said calling one of said stations advising that said entitled customer is to be paged following a completion of a call connection from said calling one of said stations to said first one of said stations.

25. A method of automatically deriving person locator service data from a data base system characterized by storing at said data base information received from a communication system, said information specifying: the person locator service active for an entitled customer, a call completion number identifying a first station at which said customer is to receive a call, and data for selectively charging a caller or said entitled customer for person locator calls to said first station, addressing said data base to examine the stored information therein in response to control signals received from communication system, and returning from said data base to said communication system coded data signifying the examined call completion number and the charging data for person locator calls.

26. The invention of claim 25 further comprising receiving at said data base from said communication system a coded message specifying automatic collect charging to said entitled customer for all calls to said first station, storing at said data base charge data representing said automatic collect charging message, examining at said data base said charge data in response to said control signals received from said communication system, and sending from said data base to said communication system in response to said examining coded data signifying the charging of person locator calls to said first station.

27. The invention of claim 25 further comprising receiving at said data base a coded message specifying a person locator number and a personal identification number, examining the charging data stored at said data base with the received person locator number and personal identification number, and charging a person locator call to said entitled customer on a collect basis when the charging data stored at said data base is authorized for the received person locator number and personal identification number.

28. A method of storing and deriving person locator service data from a data base system characterized by storing at said data base information specifying: a person locator number for caller toll-free calling on a charge to an entitled customer basis, a call completion number identifying a first station at which said customer is to receive a call, data for automatically charging all person locator calls to said customer, and data for an in-transit status of said customer;

examining the stored information in response to a person locator call control message received at said data base;

deriving a person locator call routing and charging message at said dta base in response to said examining;

and sending the derived call routing and charging message from said data base for directing a person locator call through a communication system.

29. The invention of claim 28 wherein said examining comprises comparing the stored person locator number with a person locator number portion of the control message and charging said caller for a person locator call when the comparing results in an absence of a number match.

30. A method of deriving person locator paging service data from a data base system characterized by storing at said data base information specifying that a customer to be located is to be paged and a paging number designating a station from which said customer is to be paged, addressing said data base to examine the stored information in response to a call, sending from said data base to a communication system coded data signifying that said customer is to be paged, transmitting a message to a calling station indicating that said customer is to be paged, and communicating from said data base to said communication system data pertaining to the stored paging number for effecting a completion of a call connection through said communication system to said station designated by said paging number.

31. The invention of claim 30 further characterized by transmitting a paging message to said calling station, and registering at said data base number data for said calling station for enabling said customer to callback said calling station following the paging of said customer.

* * * * *

UNITED STATES PATENT AND TRADEMARK OFFICE
CERTIFICATE OF CORRECTION

PATENT NO. : 4,313,035
DATED : January 26, 1982
INVENTOR(S) : David S. Jordan - R. P. Weber It is certified that error appears in the above—identified patent and that said Letters Patent is hereby corrected as shown below:

Column 4, line 45, "calles;" should read --calls;--.
Column 16, line 3, "frist" should read --first--.
Column 20, line 26 "dta" should read --data--.

Signed and Sealed this

Fourteenth Day of December 1982

[SEAL]

Attest:

GERALD J. MOSSINGHOFF

Attesting Officer      Commissioner of Patents and Trademarks